United States Patent
Tyagi et al.

(10) Patent No.: US 12,518,422 B2
(45) Date of Patent: Jan. 6, 2026

(54) 3D POSE ESTIMATION BASED ON COLOR AND DEPTH FEATURES

(71) Applicant: SONY GROUP CORPORATION, Tokyo (JP)

(72) Inventors: Deepshikhar Tyagi, Bengaluru (IN); Nagesh Shenoy Muniyal, Bengaluru (IN); Vishnu Kumar Sharma, Bengaluru (IN)

(73) Assignee: SONY GROUP CORPORATION, Tokyo (JP)

( * ) Notice: Subject to any disclaimer, the term of this patent is extended or adjusted under 35 U.S.C. 154(b) by 195 days.

(21) Appl. No.: 18/405,790

(22) Filed: Jan. 5, 2024

(65) Prior Publication Data
US 2025/0225677 A1   Jul. 10, 2025

(51) Int. Cl.
*G06T 7/73* (2017.01)
*G06T 7/50* (2017.01)
*G06T 7/90* (2017.01)
*G06T 15/08* (2011.01)

(52) U.S. Cl.
CPC .................. *G06T 7/74* (2017.01); *G06T 7/50* (2017.01); *G06T 7/90* (2017.01); *G06T 15/08* (2013.01); *G06T 2207/10024* (2013.01); *G06T 2207/10028* (2013.01); *G06T 2207/20081* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

| 2020/0184668 A1* | 6/2020 | Rad ......................... G06F 30/00 |
| 2023/0196617 A1* | 6/2023 | Zheng .................. G06V 10/811 |
|  |  | 382/159 |

OTHER PUBLICATIONS

Kadkhodamohammadi, et al., "A Multi-view RGB-D Approach for Human Pose Estimation in Operating Rooms", Computer Vision and Pattern Recognition, Jan. 25, 2017, 10 pages.
Sun, et al., "CrossFuNet: RGB and Depth Cross-Fusion Network for Hand Pose Estimation", Sensors, Sep. 11, 2021, 17 pages.

* cited by examiner

*Primary Examiner* — Yanna Wu
(74) *Attorney, Agent, or Firm* — CHIP LAW GROUP

(57) ABSTRACT

An electronic device and method for 3D pose estimation based on color and depth features is provided. The electronic device acquires color image data that includes an object and depth image data associated with the object. The electronic device generates a set of color feature maps based on the color image data and a set of depth feature maps based on the depth image data. The electronic device generates a set of feature fusion maps based on the set of color feature maps and the set of depth feature maps. The electronic device further generates 3D feature data of the object based on projection of each feature included in each feature fusion map to a 3D point of a 3D volume. The electronic device computes a 3D pose of the object based on application of a pose-estimation neural network on the 3D feature data and controls rendering of the 3D pose.

20 Claims, 6 Drawing Sheets

3D POSE ESTIMATION BASED ON COLOR AND DEPTH FEATURES

CROSS-REFERENCE TO RELATED APPLICATIONS/INCORPORATION BY REFERENCE

None.

FIELD

Various embodiments of the disclosure relate to three-dimensional (3D) pose estimation of 3D objects. More specifically, various embodiments of the disclosure relate to an electronic device and method for 3D pose estimation based on color and depth features.

BACKGROUND

Advancements in computer vision and machine learning have propelled the development of both two-dimensional (2D) and three-dimensional (3D) pose estimation techniques. These techniques are designed to identify and track the positions, often referred to as key-points, on objects-whether animate or inanimate-within multimedia files, such as images or videos. For animate objects like humans, these key-points can include critical body joints like knees, elbows, fingers, wrists, hips, and more. The applications of 2D and 3D pose estimation are incredibly diverse, spanning various fields including virtual reality, augmented reality, the metaverse, fitness and sports analytics, healthcare, entertainment, robotics, social media, video surveillance, gaming, driver guidance systems, and beyond. These techniques play a pivotal role in detecting interactions between objects, determining object activities, tracking bodily movements, and creating immersive 3D environments that incorporate 3D models of real-world objects.

Typically, pose estimation involves the detection and tracking of single or multiple objects through the utilization of computer vision techniques or deep learning models. For instance, in a human pose estimation task, the process entails receiving images containing a person, identifying the person, recognizing body parts, and classifying the key-points corresponding to the human body's bone joints. In the case of 2D pose estimation, the goal is to determine the 2D coordinates of key-point locations from image frames. Conversely, 3D pose estimation techniques involve projecting these 2D coordinates into a 3D space to represent key-point locations. In certain scenarios, 3D pose estimation incorporates the prediction of 3D coordinates, which convey key-point locations, based on depth information. It's important to note that accurately localizing key-points and effectively tracking the movements of animate objects based on these key-points can be a challenging task due to the computational requirements involved. This challenge arises from the need to detect key-points on one or more objects across multiple multimedia frames.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for three-dimensional (3D) pose estimation based on color and depth features, is provided substantially as shown in and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
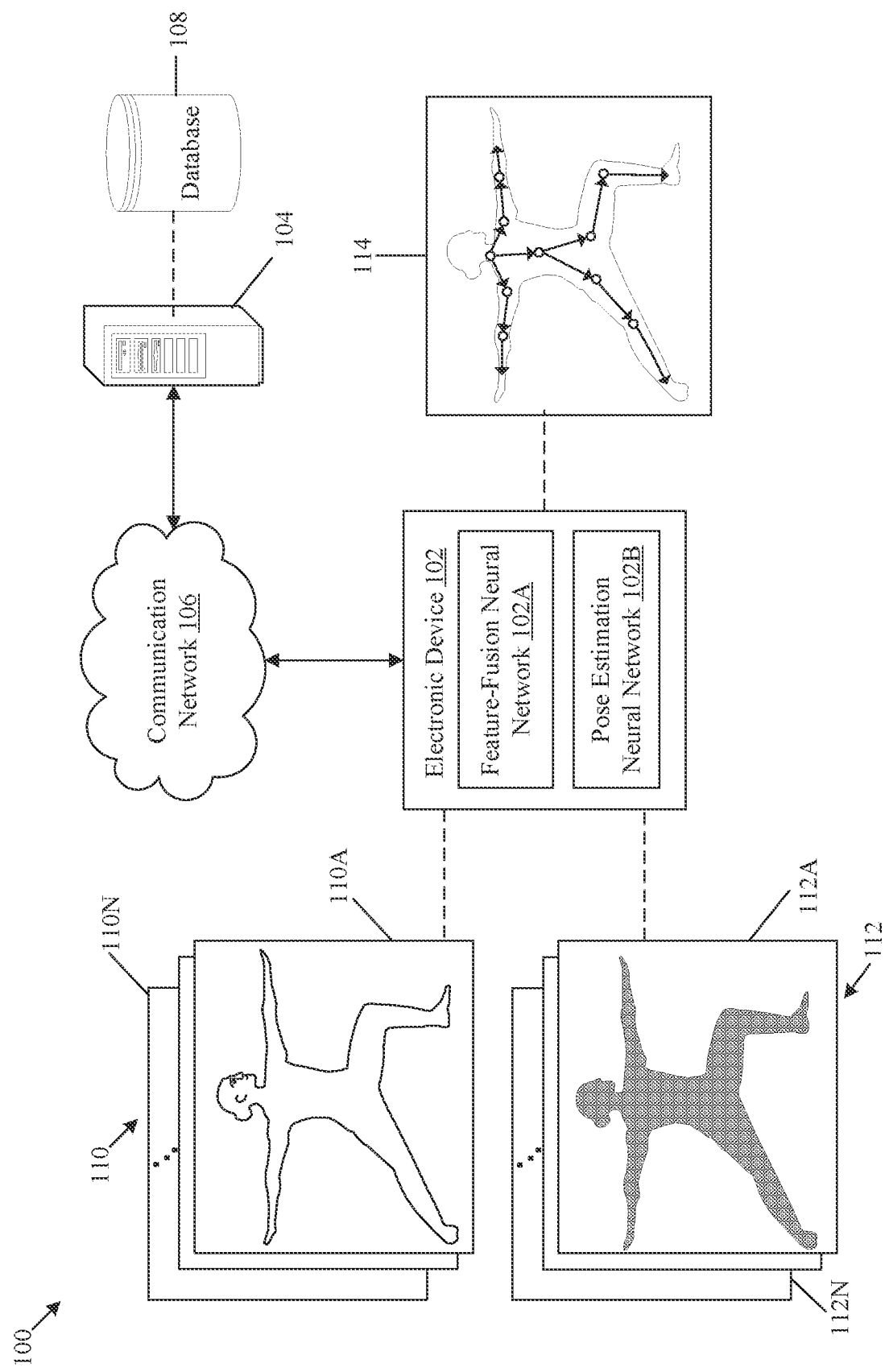
FIG. 1 is a diagram that illustrates an exemplary network environment for three-dimensional (3D) pose estimation based on color and depth features, in accordance with an embodiment of the disclosure.

The following described implementations may be found in a disclosed electronic device and method for 3-Dimensional (3D) pose estimation based on color and depth features. Exemplary aspects of the disclosure provide an electronic device that may use a set of neural networks to extract color features and depth features associated with a 3D object (such as a human), fuse the color features and the depth features to generate a fused-feature maps, project features of the fused-feature maps to a 3D volume and the depth features, and estimate a 3D pose of the 3D object based on detection of key-points, included in the 3D object, from a 3D feature set generated based on the projection of the features of the fused-feature maps onto the 3D volume. Specifically, the electronic device may acquire color image data (such as a set of images) that may include an object (such as a human) from at least one viewpoint. The electronic device may further acquire depth image data (such as depth maps) associated with the object (via depth-based sensors). After the acquisition of the color image data and the depth image data, the electronic device may generate a set of color feature maps (red-green-blue features or blue-green-red color features) based on the color image data and a set of depth feature maps based on the depth image data. Thereafter, the electronic device may generate a set of feature fusion maps based on the set of color feature maps and the set of depth feature maps. Each feature fusion map of the set of feature fusion maps may be a fusion of a color feature map of the set of color feature maps and a depth feature map of the set of depth feature maps. The electronic device may further generate 3D feature data of the object based on a projection of each feature included in each feature fusion map (of the set of feature fusion maps) to a 3D point of a 3D volume (such as a cuboid). The projection may be based on the depth image data. The electronic device may compute a 3D pose of the object based on an application of a pose-estimation neural network on the 3D feature data. The 3D pose may include heatmap information that may indicate a 3D location of each joint of a set of joints in the object (i.e., a volumetric model (such as a mesh) of the object) via the heatmap information. Finally, the electronic device may control a display device to render the 3D pose.

2D or 3D pose estimation for an object (such as a human) involves predicting and/or tracking of locations or positions of key-points (joints such as elbows, knees, hips, ankles, and so on) of an object included in a set of images or a set of video frames. 2D pose estimation may include prediction of 2D coordinates (such as x, y coordinates) for localization of a set of key-points in 2D space, whereas 3D pose estimation may include, in addition to the determination of the 2D coordinates, 3D projection of the predicted 2D coordinates in 3D space. Overall, the 3D pose estimation may include projection of 2D pose information into a 3D feature volume and subsequently, processing of the 3D volume for prediction of a set of 3D coordinates. The set of 3D coordinates may be used for localization of a set of key-points. The localization may be based on confidence maps which may not include any information associated with connectivity of key-points of the set of key-points. In some scenarios, the 3D pose may be estimated exclusively based on depth information. The depth information may be extracted from a set of depth frames that may depict an environment including the object. Based on the depth information, a 3D point cloud may be generated. The 3D point cloud may be processed, and the set of key-points may be localized in certain regions of the point cloud with a certain degree of confidence. 3D pose estimation individually based on 3D projection of 2D feature data or depth information may not lead to an accurate localization of the set of key-points. Further, an accurate localization and tacking of positions of key-points of an object across the set of frames may increase the computational complexity. This may be so, due to presence of noise in each frame of the set of frames, clothing of the object, lighting conditions in which the set of images or video frames were captured, occlusions, and so on.

In order to address aforementioned issues, the proposed electronic device may be configured to simultaneously use color image data and depth image data for 3D pose estimation. The image data may include an object from a single viewpoint or multiple viewpoints. By using the depth image data, accurate 3D projection and 3D pose estimation may be performed even in the absence of the color image data from multiple viewpoints. The color information and the depth information may be complimentary to each other and therefore, their simultaneous use may improve accuracy of localization of key-points in an object whose 3D pose may be required to be estimated. The color information and the depth information may be used for generation of color features and depth features, respectively. The color features and the depth features may be fused for generation of 2D feature data and features included in the 2D feature data may be projected onto a 3D volume based on the depth information. The features associated with at least one viewpoint may be efficiently and accurately combined into a 3D feature volume. Further, accuracy of the projection of the 2D feature data onto the 3D volume may be enhanced due to usage of the depth information for the projection. Based on processing of the 3D feature volume using deep learning techniques, 3D pose information may be obtained. The 3D pose information may be represented in a vectorized format, which may include confidence maps and offset vectors. The confidence maps may indicate a confidence of localization of the key-points of the object in different regions of a volumetric model of the object. The offset vectors may indicate relative offsets between reference locations of the key-points and predicted location counterparts. The vectorized representation may enhance preciseness of localization of the key-points regardless of the resolution of the 3D volume and allow maintaining textural continuity between the key-points. The 3D pose information may be rendered on the volumetric model as a single-level multiple-hierarchy, which may prevent cascading errors and provide an indirect skeleton connectivity between the key-points.

FIG. 1 is a diagram that illustrates an exemplary network environment for 3D pose estimation based on color and depth features, in accordance with an embodiment of the disclosure. With reference to FIG. 1, there is shown a network environment 100. The network environment 100 includes an electronic device 102 and a server 104. The electronic device 102 may communicate with the server 104, through a network (such as a communication network 106). In at least one embodiment, the electronic device 102 may include a feature-fusion neural network 102A and a pose estimation neural network 102B. In at least one embodiment, the server 104 may include a database 108. There is further shown color image data 110, depth image data 112, and a 3D pose 114. The color image data 110 may include a set of images 110A . . . 110N, each of which may include an object 116 captured from at least one viewpoint. The depth image data 112 may include a set of depth maps 112A . . . 112N, each of which may include the object 116 captured from the at least one viewpoint. The 3D pose 114 may be rendered based on 3D pose information associated with the object 116.

The term "3D pose" describes how an object (such as the object 116) is arranged spatially in 3D, including exact location and orientation in relation to a given coordinate system or reference frame. The x, y, and z axes may be used to translate the object, while angles or rotations may be used to characterize the orientation of the object. The coordinates may be used to create the 3D pose.

The electronic device 102 may include suitable logic, circuitry, interfaces, and/or code that may be configured to acquire the color image data 110 and the depth image data 112. Based on the color image data 110 and the depth image data 112, the electronic device 102 may generate color feature maps and depth feature maps. The electronic device 102 may be further configured to generate a set of feature fusion maps based on a fusion of each color feature map and a corresponding depth feature map. The features of each feature fusion map of the set of feature fusion maps may be projected onto a 3D volume for generation of 3D feature data. Thereafter, the electronic device 102 may compute the 3D pose 114 based on the 3D feature data. Examples of the electronic device 102 may include, but not be limited to, a computing device, an augmented reality (AR) device, a virtual reality (VR device), a mixed reality (MR) device, a mainframe machine, a computer workstation, a 3D graphic engine, a 3D modelling or simulation engine, a tablet, a laptop, a computing device, a smartphone, a desktop, a mobile phone, or a consumer electronic (CE) device having a display.

Each of the feature-fusion neural network 102A and the pose estimation neural network 102B may be referred to as a neural network. The neural network is a computational network or a system of artificial neurons that may typically be arranged in a plurality of layers. The neural network may be defined by its hyper-parameters, for example, activation function(s), a number of weights, a cost function, a regularization function, an input size, a number of layers, and the like. Further, the layers may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Each node in the final layer may be connected with and may receive inputs from nodes of the previous layer(s). The number of layers and the number of nodes in each layer may be determined from the hyper-parameters of the neural network. Such hyper-parameters may be set before or after training of the neural network.

Each node may correspond to a mathematical function (e.g., a sigmoid function or a rectified linear unit) with parameters that are tunable during training of the neural network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to the same or a different mathematical function. In training of the neural network, one or more parameters of each node of the neural network may be updated based on whether an output of the final layer for a given input (from the training dataset) matches a correct result in accordance with a loss function for the neural network. The above process may be repeated for the same or a different input until a minimum of the loss function is achieved, and a training error is minimized. Several methods for training are known in art, for example, gradient descent, stochastic gradient descent, batch gradient descent, gradient boost, meta-heuristics, and the like.

The feature-fusion neural network 102A may be a machine learning model that is trained to generate a set of feature fusion maps based on a set of color feature maps and a set of depth feature maps. The set of color feature maps may be generated based on color (such as reg-green-blue, blue-green-red, and so on) features associated with each frame (i.e., a view-dependent frame) of the color image data 110. Similarly, the set of depth feature maps may be generated based on depth values associated with each frame (i.e., a view-dependent frame) of the depth image data 112. The feature-fusion neural network 102A may receive, as inputs, a color feature map of the set of color feature maps and a depth feature map that corresponds to the color feature map. The color feature map and the corresponding depth feature map may be associated with a particular viewpoint of the object 116. The feature-fusion neural network 102A may generate a feature-fusion map as an output in response to the input. The generated feature-fusion map may be one amongst the set of feature fusion maps. The feature-fusion map may be indicative of features that may be a fusion of color features included in the input color feature map and depth features included in the depth feature map. Similarly, the feature-fusion neural network 102A may receive other color feature maps of the set of color feature maps and other corresponding depth feature maps of the set of depth feature maps as inputs and may generate other feature-fusion maps of the set of feature fusion maps as outputs.

The pose estimation neural network 102B may be a machine learning model that is trained to generate a vectorized representation of 3D pose information associated with the object 116. The generation may be based on a projection of 2D features included in each feature-fusion map of the set of feature fusion maps (generated as outputs of the feature-fusion neural network 102A). The pose estimation neural network 102B may receive, as an input, a 3D volume that may include 3D feature data generated based on the projection of 2D features onto the 3D volume. The 3D volume may be a geometrical representation of the object 116 in a 3D coordinate space. The pose estimation neural network 102B may generate the 3D pose information as an output in response to the input. The 3D pose information may include heatmap information and a set of offset vectors. The combination of the heatmap information and the set of offset vectors may be a vectorized representation of the 3D pose information. The heatmap information may correspond to confidence maps that indicate a degree of confidence of localization of key-points (for example, bone-joints in a human body if the object 116 is a person) in the 3D volume. The set of offset vectors may indicate difference between actual positions of the key-points and predicted positions (within a heatmap visualization) of the key-points in the 3D volume.

In accordance with an embodiment, each of the feature-fusion neural network 102A and the pose estimation neural network 102B may include electronic data that may be implemented as a software component of an application executable on the electronic device 102. Each of the feature-fusion neural network 102A and the pose estimation neural network 102B may rely on one or more of libraries, logic/instructions, or external scripts, for execution by a processing device included in the electronic device 102. In one or more embodiments, each of the feature-fusion neural network 102A and the pose estimation neural network 102B may be implemented using hardware that may include a processor, a microprocessor (e.g., to perform or control performance of one or more operations), an FPGA, or an ASIC. Alternatively, in some embodiments, each of the first neural network predictor 112 and the second neural network predictor 120 may be implemented using a combination of hardware and software. Examples of the feature-fusion neural network 102A and the pose estimation neural network 102B may include, but are not limited to, a deep neural network (DNN), a convolutional neural network (CNN), a ResNet-50 network, an artificial neural network (ANN), a fully connected neural network, and/or a combination of such networks.

The server 104 may include suitable logic, circuitry, interfaces, and/or code that may be configured to receive the color image data 110 and the depth image data 112 from the electronic device 102 or the database 108 (as a query response). In at least one embodiment, the server 104 may transmit the color image data 110 and the depth image data 112 to the electronic device 102. The server 104 may generate a set of color feature maps and a set of depth feature maps based on the color image data 110 and the depth image data 112, respectively. In at least one embodiment, the server 104 may transmit the set of color feature maps and the set of depth feature maps to the electronic device 102. The server 104 may be further configured to generate a set of feature fusion maps based on the set of color feature maps and the set of depth feature maps, project features of each feature fusion map of the set of feature fusion maps onto a 3D volume for generation of 3D feature data, and generate 3D pose information associated with the object 116 based on the 3D feature data. In at least one embodiment, the server 104 may transmit the 3D pose information to the electronic device 102. The server 104 may execute operations through web applications, cloud applications, hyper-text transfer protocol (HTTP) requests, repository operations, file transfer, and so on. Example implementations of the server 104 may include, but may not be limited to, a database server, a file server, a web server, an application server, a mainframe server, a cloud computing server, or a combination thereof.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102 as separate entities. In certain embodiments, the functionalities of the server 104 can be incorporated in its entirety or at least partially in the electronic device 102, without a departure from the scope of the disclosure.

The communication network 106 include a communication medium through which the electronic device 102 and the server 104, may communicate with each other. The communication network 106 may be a wired or wireless communication network. Examples of the communication network 106 may include, but may not be limited to, Internet, a Wireless Fidelity (Wi-Fi) network, a Personal Area Network (PAN), a Local Area Network (LAN), or a Metropolitan Area Network (MAN). Various devices in the network environment 100 may be configured to connect to the communication network 106, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The database 108 may include suitable logic, interfaces, and/or code that may be configured to store the color image data 110 and the depth image data 112. The database 108 may receive a query from the electronic device 102 or the server 104 for the color image data 110 or the depth image data 112. Based on the received query, the database 108 may generate a query response that may include the color image data 110 or the depth image data 112. The database 108 may be derived from data off a relational or non-relational database or a set of comma-separated values (csv) files in conventional or big-data storage. The database 108 may be stored or cached on a device, such as the electronic device 102 or the server 104. In an embodiment, the database 108 may be hosted on a plurality of servers stored at same or different locations. The operations of the database 108 may be executed using hardware that may include a processor, a microprocessor (e.g., to perform or control performance of one or more operations), a field-programmable gate array (FPGA), or an application-specific integrated circuit (ASIC). In some other instances, the database 108 may be implemented using software.

In operation, the electronic device 102 may be configured to acquire the color image data 110 that may include the object 116 from at least one viewpoint. The color image data 110 may be acquired from the server 104 (or the database 108 via the server 104). In some embodiments, the color image data 110 may be acquired by use of a set of image capture devices that may be controlled to capture the set of images 110A ... 110N of the object 116. The set of images may be captured from 110A ... 110N at least one viewpoint (such as one or more of a top-view, a back-side view, a front-view, a right-side view, a left-side view, and so on) associated with the object 116. The color image data 110 may include the set of images 110A ... 110N and pixels of each image of the set of images 110A ... 110N may be associated with a particular color space (such as RGB (reg, green, blue), BGR (blue, green, red), HSV (hue, saturation, value), $YC_BC_R$ (luma, blue-difference chroma, red-difference chroma), and so on).

The electronic device 102 may be further configured to acquire the depth image data 112 associated with the object 116. The depth image data 112 may include a set of depth images (i.e., the set of depth maps 112A ... 112N). The depth image data 112 may be acquired from the server 104 (or the database 108 via the server 104). In accordance with an embodiment, the set of depth maps 112A ... 112N (i.e., the depth image data 112) may be acquired from at least one viewpoint by use of a set of depth sensors. In some embodiments, the acquisition of the set of depth maps 112A ... 112N may be based on the set of images 110A ... 110N included in the color image data 110 and the set of depth maps 112A ... 112N may correspond to the set of images 110A ... 110N. Thus, there may be a correspondence between each depth map of the set of depth maps 112A ... 112N and each image of the set of images 110A ... 110N. Each depth map (such as the depth map 112A) of the set of depth maps 112A ... 112N may include a set of pixels. An intensity of each pixel of the set of pixels may be indicative of a distance between a depth sensor of the set of depth sensors (or an image capture device of the set of image capture devices) and a region of the object 116 (or any other thing included in a scene that includes the object 116) represented by the corresponding pixel.

The electronic device 102 may be further configured to generate a set of color feature maps based on the color image data 110. Each color feature map of the set of color feature maps may correspond to an image of the set of images 110A ... 110N (i.e., the color image data 110) and may correspond to a specific viewpoint or a viewpoint of the set of viewpoints. In accordance with an embodiment, the generation of each color feature map may be based on an application of a neural network (such as a residual neural network) on a corresponding input image of the set of images 110A ... 110N. Each color feature map, generated as an output of the neural network, may include a set of color features. Each color feature of the set of color features, included in a color feature map, may be determined based on color characteristics associated with a pixel of the corresponding image and weights associated each filter of a set of filters that may be part of each layer of the neural network. The color characteristics may include variables such as hue (i.e., the primary colors, viz., red, green, and blue), intensity, value, saturation, brightness, warmness, and so on.

The electronic device 102 may be further configured to generate a set of depth feature maps based on the depth image data 112. Each depth feature map of the set of depth feature maps may correspond to a depth image (i.e., depth map) of the set of depth maps 112A ... 112N (i.e., the depth image data 112) and may correspond to at least one viewpoint. The set of depth feature maps may correspond to the set of color feature maps. This may be due to correspondence between the set of images 110A ... 110N (color image data 110) and the set of depth maps 112A ... 112N (depth image data 112). Therefore, there may be a one-to-one correspondence between each depth feature map of the set of depth feature maps and each color feature map of the set of color feature maps, which may be used for their fusion.

In accordance with an embodiment, the generation of each depth feature map may be based on application of a neural network (such as a residual neural network) on a corresponding depth map of the set of depth maps 112A ... 112N. Each depth feature map, generated as an output of the neural network, may include a set of depth features. Each depth feature of the set of depth features, included in a depth feature map, may be determined based on intensity (indicative of a depth value) of a pixel of a corresponding depth image (i.e., depth map) and weights associated each filter of a set of filters that may be part of each layer of the neural network.

The electronic device 102 may be further configured to generate a set of feature fusion maps based on the set of color feature maps and the set of depth feature maps. Each feature fusion map of the set of feature fusion maps may be a fusion of a color feature map of the set of color feature maps and a depth feature map of the set of depth feature maps. Further, each feature fusion map may be associated with a viewpoint. In accordance with an embodiment, each feature fusion map of the set of feature fusion maps may include a set of fused features. Each fused feature of the set of fused features may be a fusion of a color feature and a depth feature. The color feature may belong to a color feature map of the set of color feature maps and the depth feature may belong to a depth feature map of the set of depth feature maps that may correspond to the color feature map. In accordance with an embodiment, each feature fusion map of the set of feature fusion maps may be generated based on application of the feature-fusion neural network 102A on each color feature map of the set of color feature maps and a corresponding depth feature map of the set of depth feature maps.

At any time-instant, a first color feature map of the set of color feature maps and a corresponding first depth feature map of the set of depth feature maps may be fed as inputs to the feature-fusion neural network 102A. The feature-fusion neural network 102A may generate, as an output, a first feature fusion map of the set of feature fusion maps. Similarly, each of the other feature fusion maps of the set of feature fusion maps may be generated as outputs based on application of the feature-fusion neural network 102A on inputs that include each of the other color feature maps of the set of color feature maps and corresponding depth feature maps of the set of depth feature maps.

The electronic device 102 may be further configured to generate 3D feature data of the object 116 based on a projection of each feature included in each feature fusion map of the set of feature fusion maps to a 3D point of a 3D volume. The projection may be based on the depth image data 112. In accordance with an embodiment, the projection may be further based on one or more parameters of each image capture device of the set of image capture devices that may be used to capture the set of images 110A ... 110N of the object 116. Based on the projection, the 3D volume may be filled with 3D features at a set of positions inside the 3D volume. The set of positions may be determined based on the depth image data 112 and the one or more parameters. The set of positions may correspond to a set of 3D points, and, for generation of a 3D feature, at least one feature included in at least one feature fusion map of the set of feature fusion maps may be projected at each 3D point of the set of 3D points. The 3D feature data may include a set of 3D features generated based on projection of all features included in all feature fusion maps of the set of feature fusion maps at the set of 3D points. In some embodiments, based on filling of the 3D volume with the 3D feature data, a volumetric model of the object 116, that corresponds to the 3D volume, may be generated.

The electronic device 102 may be further configured to compute the 3D pose 114 of the object 116 based on an application of the pose-estimation neural network 102B on the 3D feature data. The 3D pose 114 may include heatmap information that may be indicative of a 3D location of each joint (i.e., a bone-joint or key-point) of a set of joints in the object 116 (i.e., a human). In accordance with an embodiment, the pose-estimation neural network 102B may receive, as input, the 3D feature data, i.e., a set of 3D features inside the 3D volume. The pose-estimation neural network 102B may generate an output that corresponds to 3D pose information associated with the object 116. The generation may be based on application of sparse convolution operations on the 3D feature data by use of a set of filters at a set of layers of the pose-estimation neural network 102B. The output 3D pose information may be a vector representation that may include the heatmap information.

In accordance with an embodiment, the heatmap information may include a set of confidence maps, and each confidence map of the set of confidence maps may indicate a confidence that a joint of the set of joints may be located at a region in the 3D volume or the volumetric model of the object 116. In accordance with an embodiment, the output 3D pose information may further include a set of offset vectors. Each offset vector of the set of offset vectors may indicate a relative difference between an actual position (ground-truth) of each joint of the set of joints and a predicted location of the corresponding joint in the 3D volume or the volumetric model of the object 116. The output vector representation may enable efficient localization of the set of joints irrespective of the resolution of voxels of the 3D volume or the volumetric model of the object 116.

The electronic device 102 may be further configured to control a display device to render the computed 3D pose 114. The 3D pose 114 may include a set of regions (indicated in the set of confidence maps) in the 3D volume or the volumetric model where the set of joints may be located. Based on the output of the pose-estimation neural network 102B, it may be determined, with a certain level (a value) of confidence, that the set of joints are located at the set of regions. Each region of the set of regions, apart from those that may include non-leaf joints, may be referred to as a hierarchy. Since the 3D pose 114 includes multiple regions, the 3D pose 114 may be rendered as multi-hierarchy. The rendered 3D pose 114 may further include a set of vectors (i.e., connectors) and each connector of the set of connectors may connect two joints (that correspond to regions of the set of regions) of the set of joints with each other. Since each connector connects only two joints of the set of joints, the 3D pose 114 may be rendered as single-level. Further, each connector may indicate a direction from a first joint (i.e., region or hierarchy) of the set of joints to a second joint (i.e., region or hierarchy) of the set of joints. Thus, the 3D pose 114 may be rendered as a single-level multi-hierarchy.

Figure 2:
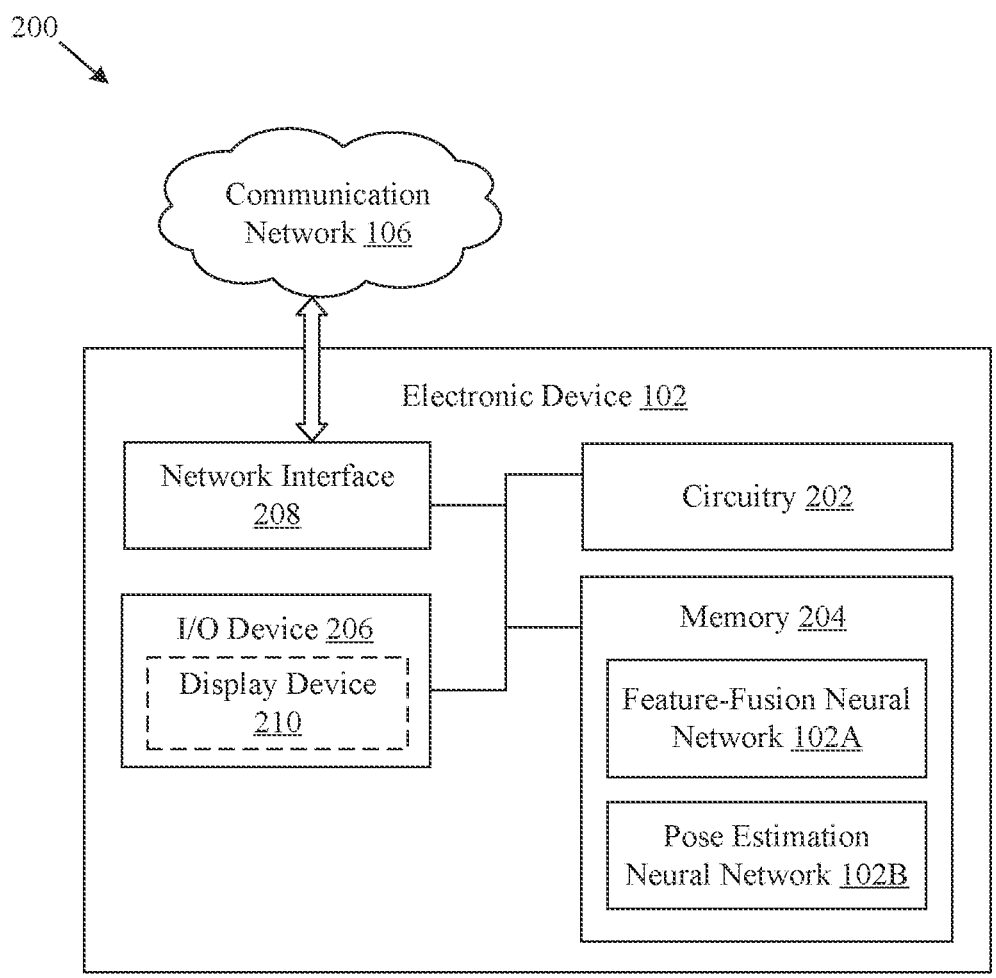
FIG. 2 is a block diagram that illustrates an exemplary electronic device of FIG. 1, for 3D pose estimation based on color and depth features, in accordance with an embodiment of the disclosure.

FIG. 2 is a block diagram that illustrates an exemplary electronic device of FIG. 1, for 3D pose estimation based on color and depth features, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, and a network interface 208. In at least one embodiment, the I/O device 206 may include a display device 210. In at least one embodiment, the memory 204 may include a feature-fusion neural network 102A and a pose estimation neural network 102B. The circuitry 202 may be communicatively coupled to the memory 204, the I/O device 206, and the network interface 208, via wired or wireless communication of the electronic device 102.

The circuitry 202 may include suitable logic, circuitry, and interfaces that may be configured to execute program instructions associated with different operations to be executed by the electronic device 102. The operations may include acquisition of the color image data 110 and the depth image data 112, generation of the set of color feature maps and the set of depth feature maps, the set of feature fusion maps, and the 3D feature data of the object 116, computation of the 3D pose 114 of the object 116 and controlling of the display device 210 to render the 3D pose 114 of the object 116. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a central processing unit (CPU), a Graphics Processing Unit (GPU), a microcontroller, a Reduced Instruction Set Computing (RISC) processor, an Application-Specific Integrated Circuit (ASIC) processor, a Complex Instruction Set Computing (CISC) processor, and/or other computing circuits.

The memory 204 may include suitable logic, circuitry, interfaces, and/or code that may be configured to store the program instructions to be executed by the circuitry 202. The program instructions stored on the memory 204 may enable the circuitry 202 to execute operations of the circuitry 202 (the electronic device 102). In an embodiment, the memory 204 may be configured to store the acquired color image data 110 and the acquired depth image data 112. The memory 204 may be further configured to store the generated set of color feature maps and the generated set of depth feature maps. The memory 204 may be further configured to store the set of feature fusion maps and the 3D feature data of the object 116. The memory 204 may be further configured to store the 3D pose 114 of the object 116. Examples of implementation of the memory 204 may include, but are not limited to, Random Access Memory (RAM), Read Only Memory (ROM), Hard Disk Drive (HDD), Electrically Erasable Programmable Read-Only Memory (EEPROM), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a user input indicative of an instruction to acquire the color image data 110 or the depth image data 112. The I/O device 206 may further receive a user input indicative of an instruction to generate the set of color feature maps, the set of depth feature maps, the set of feature fusion maps, and the 3D feature data of the object 116. The I/O device 206 may further receive a user input to compute the 3D pose 114 of the object 116 based on the 3D feature data of the object 116.

Examples of the I/O device 206 may include, but are not limited to, a touch screen, a keyboard, a mouse, a joystick, a microphone, the display device 210, and a speaker.

The I/O device 206 may include the display device 210. The display device 210 may include suitable logic, circuitry, and interfaces that may be configured to receive inputs from the circuitry 202 to render, on a display screen, the color image data 110, the depth image data 112, the set of color feature maps, the set of depth feature maps, the set of feature fusion maps, the 3D feature data of the object 116, and the 3D pose 114 of the object 116. In at least one embodiment, the display screen of the display device 210 may be at least one of a resistive touch screen, a capacitive touch screen, or a thermal touch screen. The display device 210 or the display screen may be realized through several known technologies such as, but not limited to, at least one of a Liquid Crystal Display (LCD) display, a Light Emitting Diode (LED) display, a plasma display, or an Organic LED (OLED) display technology, or other display devices.

The network interface 208 may include suitable logic, circuitry, and interfaces that may be configured to facilitate a communication between the circuitry 202 and the server 110, via the communication network 106. The network interface 208 may be implemented by use of known technologies to support wired or wireless communication of the electronic device 102 with the communication network 106. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, or a wireless network, such as a cellular telephone network, a wireless local area network (LAN), a short-range communication network, and a metropolitan area network (MAN). The wireless communication may use one or more of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a near field communication protocol, and a wireless pear-to-pear protocol.

The functions or operations executed by the electronic device 102, as described in FIG. 1, may be performed by the circuitry 202. Operations executed by the circuitry 202 are described in detail, for example, in FIG. 3, FIG. 4, and FIG. 5.

Figure 3:
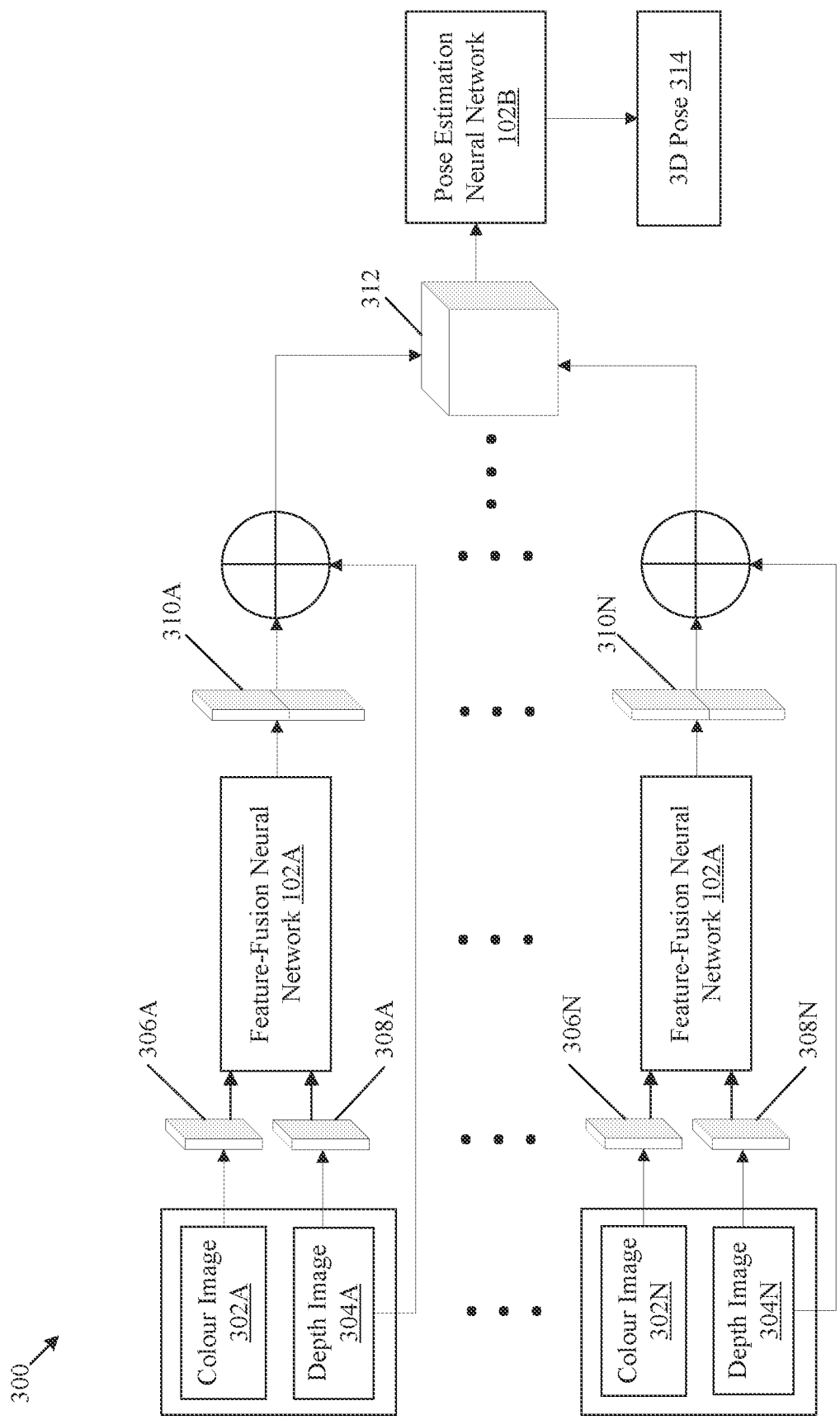
FIG. 3 is a block diagram that illustrates an exemplary process for 3D pose estimation based on color and depth features, in accordance with an embodiment of the disclosure.

FIG. 3 is a block diagram that illustrates an exemplary process for 3D pose estimation based on color and depth features, in accordance with an embodiment of the disclosure. FIG. 3 is explained in conjunction with elements from FIG. 1 and FIG. 2. With reference to FIG. 3, there is shown a block diagram 300. The exemplary block diagram 300 may include operations that may be executed by one or more components of FIG. 1, such as, the circuitry 202 of the electronic device 102. The set of operations may be performed for estimation of 3D pose based on color and depth features. The exemplary block diagram 300 may include the feature-fusion neural network 102A and the pose estimation neural network 102B of FIG. 1.

At any time-instant, the circuitry 202 may be configured to acquire color image data. The color image data may include a set of color images 302A . . . 302N. Each color image of the set of color images 302A . . . 302N may include an object. The color image data may be acquired based on capturing of the set of color images 302A . . . 302N by use of a set of image capture devices. Further, the set of image capture devices may be positioned such that the set of color images 302A . . . 302N are captured from a single viewpoint or from a set of viewpoints associated with the object. Each color image (such as the color image 302A) of the set of color images 302A . . . 302N may include a set of pixels. Each pixel may include information associated with color characteristics. For example, the set of color images 302A . . . 302N may be associated with RGB color space. Therefore, each pixel of each color image of the set of color images 302A . . . 302N may include values associated with intensities of red color, green color, and blue color.

The circuitry 202 may be further configured to acquire depth image data. The depth image data may include a set of depth images (or depth maps) 304A . . . 304N. Each depth image (or depth map) of the set of depth images 304A . . . 304N may include the object. The acquisition of the depth image data may be based on the set of color images 302A . . . 302N or depth information acquired by use of a set of depth sensors positioned such that the depth information may be captured from at least one viewpoint associated with the object. Therefore, the set of depth images 304A . . . 304N may correspond to the set of color images 302A . . . 302N. Each depth image (such as the depth image 304A) of the set of depth images 304A . . . 304N may include a set of pixels. The intensity of each pixel of the depth image 304A may indicate a distance between an image capture device used to capture the color image 302A (or a depth sensor used to generate the depth image 304A) and a scene that is represented by the corresponding pixel. The intensity may be a depth value associated with the pixel.

The circuitry 202 may be further configured to apply a neural network (for e.g., a convolutional neural network (CNN) such as residual neural network (ResNet)) on each color image of the set of color images 302A . . . 302N and each depth image of the set of depth images 304A . . . 304N. Based on the application of the neural network on an input that corresponds to the color image data (i.e., the set of color images 302A . . . 302N), a set of color feature maps 306A . . . 306N may be generated as output. For example, based on application of the neural network on the color image 302A, a color feature map 306A may be generated. Similarly, based on application of the neural network on the color image 302N, a color feature map 306N may be generated.

On the other hand, based on the application of the neural network on an input that corresponds to the depth image data (i.e., the set of depth images 304A . . . 304N), a set of depth feature maps 308A . . . 308N may be generated as output. For example, based on application of the neural network on the depth image 304A, a depth feature map 308A may be generated. Similarly, based on application of the neural network on the depth image 304N, a depth feature map 308N may be generated. The set of depth feature maps 308A . . . 308N may correspond to the set of color feature maps 306A . . . 306N. For example, the color feature map 306A may correspond to the depth feature map 308A. The correspondence may be based on association of each of the color feature map 306A and the depth feature map 308A with the same viewpoint. Similarly, the color feature map 306N may correspond to the depth feature map 308N.

The circuitry 202 may be further configured to apply the feature-fusion neural network 102A on each color feature map of the set of color feature maps 306A . . . 306N and each depth feature map of the set of depth feature maps 308A . . . 308N. Based on such an application, color features in each of the color feature maps of the set of color feature maps 306A . . . 306N may be fused with depth features in each of the corresponding depth feature maps of the set of depth feature maps 308A . . . 308N. For example, the color feature map 306A and the depth feature map 308A may be fed as inputs to the feature-fusion neural network 102A. Based on the application, a feature fusion map 310A may be generated. Each color feature in the color feature map 306A may be fused with a depth feature of the corresponding depth feature map 308A for the generation of the feature fusion map 310A. Similarly, the circuitry 202 may apply the feature-fusion neural network 102A on the color feature map 306N and a depth feature map 308N to generate a feature fusion map 310N. Thus, a set of feature fusion maps 310A . . . 310N may be generated. Each feature fusion map may be associated with at least one viewpoint. A color feature map and a depth feature map, based on which the corresponding feature fusion map is generated, may be associated with the same viewpoint. For example, the feature fusion map 310A, the color feature map 306A, and the depth feature map 308A may be associated with the same viewpoint.

In accordance with an embodiment, the input layer (or first layer) of the feature-fusion neural network 102A may receive the color feature map 306A and the depth feature map 308A as inputs. The first layer may include two sub-layers. At the first sub-layer, the depth feature map 308A may be concatenated with the color feature map 306A for generation of a first result. On the other hand, at the second sub-layer, the color feature map 306A may be concatenated with the depth feature map 308A for generation of a second result. The first result and the second result may be received as inputs by a first hidden layer (or second layer) of the feature-fusion neural network 102A. The second layer may include two sub-layers. At the first sub-layer, a first convolution operation may be applied on the first result to generate a third result. On the other hand, at the second sub-layer, a second convolution operation may be applied on the second result to generate an intermediate result. The intermediate result may be received as an input by a second hidden layer (or third layer) of the feature-fusion neural network 102A.

At the third layer, a deconvolution operation may be applied on the intermediate result to generate a fourth result. The third result and the fourth result may be received as inputs by a third hidden layer (or fourth layer) of the feature-fusion neural network 102A. At the fourth layer, the third result and the fourth result may be concatenated for generation of a fifth result. The fifth result may be received as an input by a fourth hidden layer (or fifth layer). Thereafter, a set of convolution-deconvolution operations may be applied on inputs at the fifth layer and each of the other layers succeeding the fifth layer. For example, a convolution operation may be applied on the fifth result. An output generated by the fifth layer may be received as an input by the sixth layer. The output layer (or final layer) of the feature-fusion neural network 102A may generate the feature fusion map 310A.

Similarly, the feature-fusion neural network 102A may generate, as outputs, each of the other feature fusion maps (i.e., the feature fusion map 310B, . . . , and the feature fusion map 310N). The generation may be based on reception, as inputs, each of the other color feature maps of the set of color feature maps 306A . . . 306N and the other corresponding depth feature maps of the set of depth maps 308A . . . 308N.

The circuitry 202 may be further configured to project features of each feature fusion map of the set of feature fusion maps 310A . . . 310N onto a 3D volume 312. The projection may be based on depth image data that may include the set of depth images 304A . . . 304N. The projection of features of a certain feature fusion map associated with a viewpoint may be based on a depth image of the set of depth images 304A . . . 304N associated with the same viewpoint. For example, features of the feature fusion map 310A may be projected onto the 3D volume 312 based on the depth image 304A. Similarly, features of the feature fusion map 310N may be projected onto the 3D volume 312 based on the depth image 304N. Thus, features associated with at least one viewpoint (included in different feature fusion maps of the set of feature fusion maps 310A . . . 310N) may be fused onto the 3D volume 312 based on the projection.

In accordance with an embodiment, the circuitry 202 may be configured to determine a set of camera parameters associated with one or more image capture devices of the set of image capture devices that may be used in the acquisition of the color image data (i.e., the set of color images 302A . . . 302N). Thereafter, the circuitry 202 may determine, from the depth image data (i.e., the set of depth images 304A . . . 304N), depth information that corresponds to a feature of a feature fusion map of the set of feature fusion maps 310A . . . 310N. For example, a first feature of the feature fusion map 310A may be generated based on fusion of a color feature included in the color feature map 306A and a depth feature included in the depth feature map 308A. The depth feature may be determined based on one or more depth values associated with one or more pixels of the depth image 304A. The circuitry 202 may determine, from the depth image 304A, depth information that may include the one or more depth values. The determined depth information may correspond to the first feature of the feature fusion map 310A. The circuitry 202 may further project the feature (for example, the first feature) to a 3D point (inside the 3D volume 312) based on the depth information (the one or more depth values) and the set of camera parameters.

Thus, each feature in each feature fusion map of the set of feature fusion maps 310A . . . 310N may be projected onto a 3D point inside the 3D volume 312. There may be scenarios where multiple features included in multiple feature fusion maps of the set of feature fusion maps 310A . . . 310N may be projected to the same 3D point. Based on such projections, 3D feature data may be generated. Based on the 3D feature data, the circuitry 202 may generate a volumetric model of the object (included in the set of color images 302A . . . 302N and the set of depth images 304A . . . 304N). In some scenarios, the 3D volume 312 may be the volumetric model.

The circuitry 202 may be further configured to apply the pose estimation neural network 102B on the 3D feature data included in the 3D volume. Based on the application, a 3D pose 314 may be computed. The 3D pose 314 may include heatmap information that may indicate a 3D location of each joint (i.e., a bone joint such as elbow, ankle, wrist, knee, and so on) of a set of joints in the object. In accordance with an embodiment, the heatmap information may indicate, via a set of confidence maps, a confidence in a localization of each joint of the set of joints in a set of regions in the 3D volume 312 or the volumetric model. The set of joints may include a subset of leaf joints (such as wrist, ankle, and so on) and a subset of non-leaf joints (such as elbow, neck, knee, and so on). Each non-leaf joint may indicate a hierarchy. If the 3D pose 314 includes multiple non-leaf joints, the 3D pose 314 may be referred to as multi-hierarchy.

In accordance with an embodiment, the 3D pose 314 may further include a set of offset vectors. Each offset vector of the set of offset vectors may represent a relative offset between the 3D location of a joint of the set of joints from a reference location of the joint. The heatmap information and the set of offset vectors may be generated based on an application of a set of sparse 3D convolution operations on the 3D feature data. Each sparse 3D convolution operation may be applied on an input of each layer or each sub-layer (within each layer) of the pose estimation neural network 102B. For example, the 3D feature data may be received as input at an input layer (or first layer) of the pose estimation neural network 102B. At the first layer, a sparse 3D convolution operation may be applied on the 3D feature data for generation of a first result. A first hidden layer (or second layer) of the pose estimation neural network 102B may receive the first result as input. Such sparse 3D convolution operations may be applied on inputs at each layer and each sub-layer. The output layer (or final layer) of the pose estimation neural network 102B may include two sub-layers. A first sub-layer of the two-sublayers may generate the heatmap information as output based on application of a sparse 3D convolution operation on an input of the first sub-layer. A second sub-layer of the two-sublayers may generate the set of offset vectors as output based on application of a sparse 3D convolution operation on an input of the second sub-layer. A combination of the heatmap information and the set of offset vectors may be a vector representation of the 3D pose 314.

The circuitry 202 may be further configured to control the display device 210 to render the 3D pose 314. The 3D pose 314 may be rendered on the volumetric model of the object. The 3D pose 314 may include a set of connectors (vectors). Each connector (vector) of the set of connectors may connect two joints of the set of joints. Thus, each connector may connect two joints at a single-level and may be referred to as a single-level vector. Each connector (vector) may indicate a direction from a non-leaf joint (hierarchy) to another non-leaf joint (hierarchy) or a leaf joint.

Figure 4:
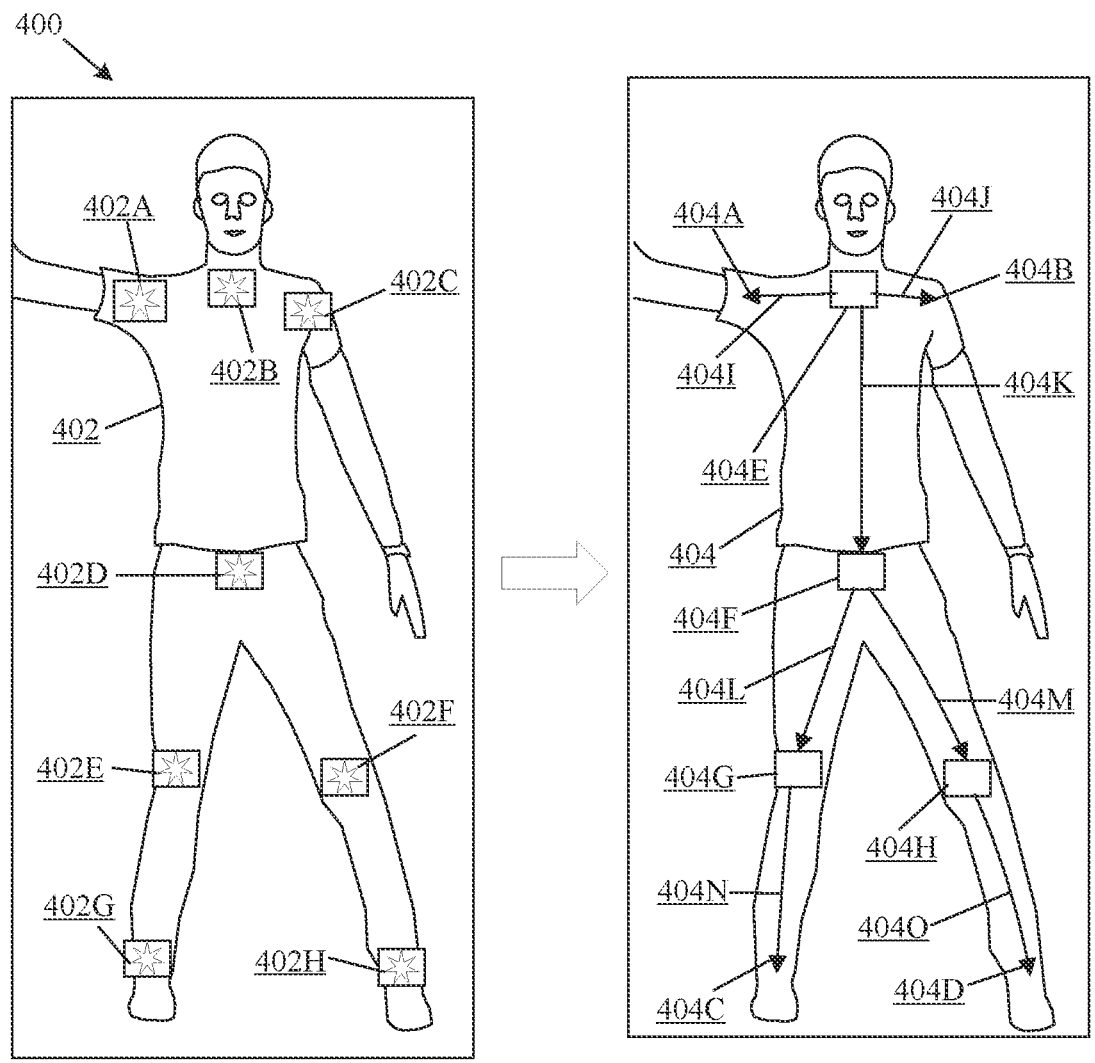
FIG. 4 is a diagram that illustrates exemplary 3D pose estimated based on color features and depth features, in accordance with an embodiment of the disclosure.

FIG. 4 is a diagram that illustrates exemplary 3D pose estimated based on color features and depth features, in accordance with an embodiment of the disclosure. FIG. 4 is explained in conjunction with elements from FIG. 1, FIG. 2, and FIG. 3. With reference to FIG. 4, there is shown an exemplary scenario 400. In the exemplary scenario 400 there is shown a volumetric model 402 of an object that includes heatmap information. There is further shown an exemplary 3D pose 404 of the object. The generation of the 3D pose 404 may be based on color features acquired from color image data and depth features acquired from depth image data. The color features and the depth features may include the object. The heatmap information may include a set of 3D locations 402A . . . 402H of a set of joints (i.e., bone joints or key-points) in the object and indicate a confidence in a localization of each joint of the set of joints at the set of 3D locations 402A . . . 402H in the volumetric model 402 of the object.

The 3D pose 404 may include the set of joints. The set of joints may include a subset of leaf joints 404A . . . 404D (such as wrist or ankle) and a subset of non-leaf joints 404E . . . 404H (such as elbow, neck, or knee). Each non-leaf joint may indicate a hierarchy. The 3D pose 404 may further include a set of connectors (vectors) 4041 . . . 404O. Each connector (vector) of the set of connectors may connect two joints of the set of joints. Each connector may indicate a direction from a non-leaf joint (hierarchy) to another non-leaf joint (hierarchy) or a leaf joint. The 3D pose 404 may be referred to as single-level, multi-hierarchy.

Figure 5:
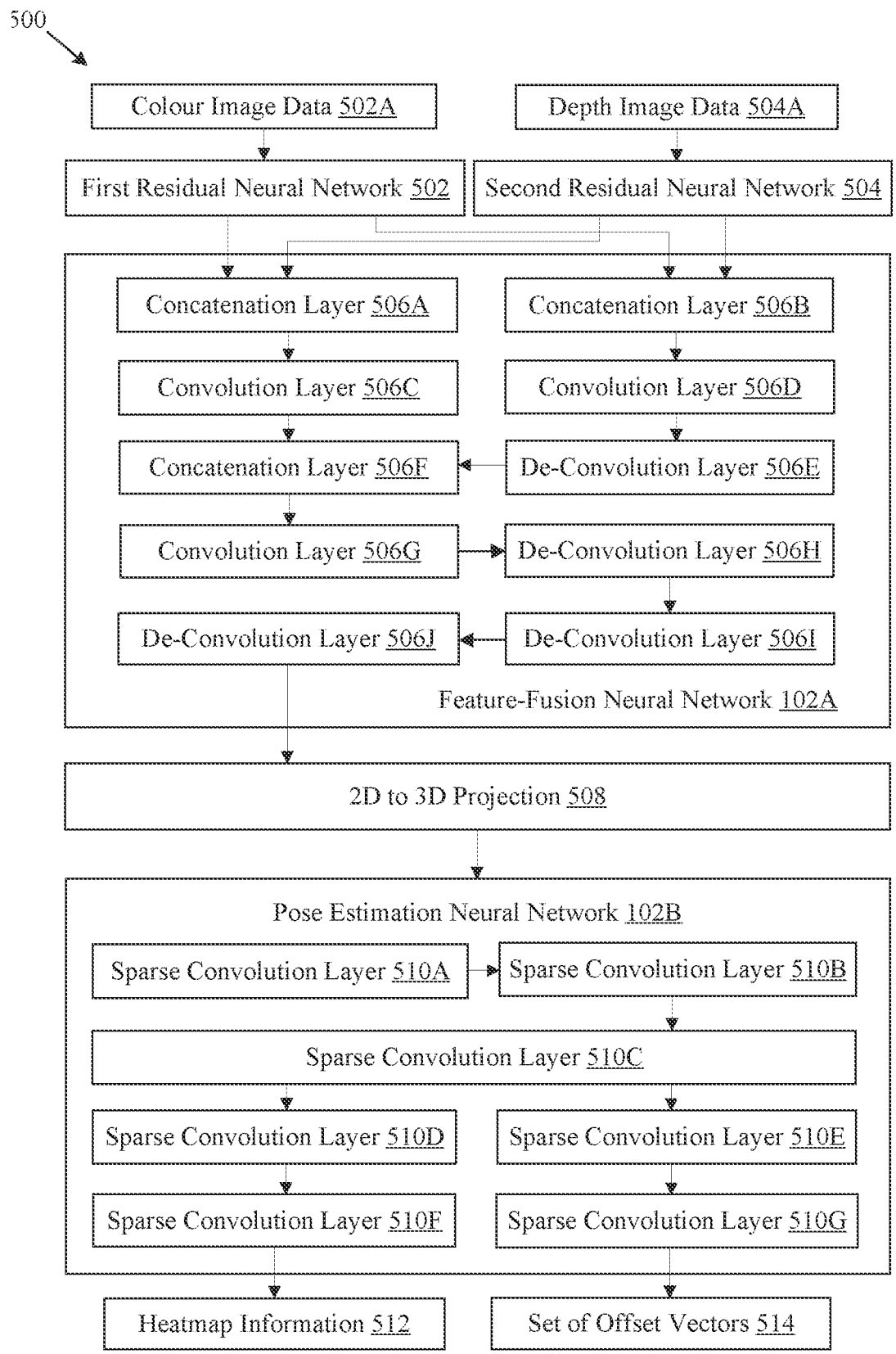
FIG. 5 is a diagram that illustrates exemplary architectures of neural networks for performance of a 3D pose estimation task based on color features and depth features, in accordance with an embodiment of the disclosure.

FIG. 5 is a diagram that illustrates exemplary architectures of neural networks for performance of a 3D pose estimation task based on color features and depth features, in accordance with an embodiment of the disclosure. FIG. 5 is explained in conjunction with elements from FIG. 1, FIG. 2, FIG. 3, and FIG. 4. With reference to FIG. 5, there is shown an exemplary scenario 500. In the exemplary scenario 500 there is shown a first residual neural network 502, a second residual neural network 504, an architecture of the feature-fusion neural network 102A and the pose estimation neural network 102B. The first residual neural network 502 and the second residual neural network 504 may be used for independent extraction of color features and depth features, respectively.

The feature-fusion neural network 102A may include a concatenation layer 506A, a concatenation layer 506B, a convolution layer 506C, a convolution layer 506D, a deconvolution layer 506E, a concatenation layer 506F, a convolution layer 506G, a deconvolution layer 506H, a deconvolution layer 506I, and a deconvolution layer 506J. The pose estimation neural network 102B may include a sparse convolution layer 510A, a sparse convolution layer 510B, a sparse convolution layer 510C, a sparse convolution layer 510D, a sparse convolution layer 510E, a sparse convolution layer 510F, and a sparse convolution layer 510G.

In accordance with an embodiment, the first residual neural network 502 may receive color image data 502A as input. The color image data 502A may include a set of color images. Each color image of the set of color images may be associated with a viewpoint of an object whose 3D pose may be required to be estimated. The first residual neural network 502 may generate, as output, a set of color feature maps which may correspond to the set of color images. Similarly, the second residual neural network 504 may receive depth image data 504A as input. The depth image data 504A may include a set of depth images. Each color image of the set of color images may correspond to each depth image of the set of depth images. Each depth image of the set of depth images may be associated with a viewpoint of an object whose 3D pose may be required to be estimated. The second residual neural network 504 may generate, as output, a set of depth feature maps, which may correspond to the set of depth images.

The feature-fusion neural network 102A may receive the set of color feature maps and the set of depth feature maps as inputs. Each of the concatenation layer 506A and the concatenation layer 506B may receive the set of color feature maps and the set of depth feature maps as inputs. The inputs may be received for fusion of color features in each color feature map of the set of color feature maps and depth features included in each corresponding depth feature map of the set of depth feature maps.

At a first time-instant, a first color feature map of the set of color feature maps and a first depth feature map of the set of depth feature maps may be received as inputs by each of the concatenation layer 506A and the concatenation layer 506B. The concatenation layer 506A may concatenate the first depth feature map with the first color feature map to generate a first result. The first depth feature map may correspond to the first depth feature map. The first result may be a fusion of color features of the first color feature map and depth features of the first depth feature map. Similarly, the concatenation layer 506B may concatenate the first color feature map with the first depth feature map to generate a second result. The second result may be a fusion of the depth features and color features. The first result may be received as an input by the convolution layer 506C. A first convolution operation may be applied on the first result at the convolution layer 506C for generation of a third result as output. On the other hand, the second result may be received as an input by the convolution layer 506D. A second convolution operation may be applied on the second result at the convolution layer 506D for generation of a fourth result as output. The fourth result may be received as an input by the deconvolution layer 506E. A first deconvolution operation may be applied on the fourth result at the deconvolution layer 506E for generation of a fifth result as output. The first convolution, the second convolution, and the first deconvolution may be applied for bringing concatenated features or fused features, obtained as the first result and the second result, to a common resolution. The third result and the fifth result may be received as inputs by the concatenation layer 506F, which may concatenate the third result and the fifth result for generation of a sixth result. The sixth result may be received as an input by the convolution layer 506G, which may generate a seventh result based on application of a convolution operation on the sixth result.

Thereafter, deconvolution operations may be applied on inputs of each of the deconvolution layer 506H, the deconvolution layer 506I, and the deconvolution layer 506J. An output of the deconvolution layer 506J may be a first 2D feature fusion map. The first 2D feature fusion map may be a fusion of features of the first color feature map and features of the first depth feature map. Further, the first 2D feature fusion map may be associated with a first viewpoint. Similarly, an $N^{th}$ 2D feature fusion map may be generated as output of the deconvolution layer 506J based on reception of an $N^{th}$ color feature map of the set of color feature maps and an $N^{th}$ depth feature map of the set of depth feature maps as inputs by each of the concatenation layer 506A and the concatenation layer 506B. The $N^{th}$ 2D feature fusion map may be a fusion of features of the $N^{th}$ color feature map and features of the $N^{th}$ depth feature map. Further, the $N^{th}$ 2D feature fusion map may be associated with a $N^{th}$ viewpoint.

At 508, each feature of each 2D feature fusion map may be projected to a 3D point in a 3D volume for generation of 3D feature data. The projection may be based on one or more parameters of each image capturing device of a set of image capturing devices that may be used to acquire the set of color images (i.e., the color image data 502A) and the set of depth images (i.e., the depth image data 504A). The projection may be further based on depth image data 504A. The features included in different 2D feature maps and associated with at least one viewpoint may be fused onto the 3D volume based on the projection.

The pose estimation neural network 102B may receive, as input, the 3D volume, which may include the 3D feature data. A set of sparse 3D convolution operations may be applied on inputs of each of the layers (i.e., the sparse convolution layer 510A, the sparse convolution layer 510B, the sparse convolution layer 510C, the sparse convolution layer 510D, the sparse convolution layer 510E, the sparse convolution layer 510F, and the sparse convolution layer 510G) of the pose estimation neural network 102B. The pose estimation neural network 102B may predict a 3D pose of the object as an output. The 3D pose may be a vector representation that may include heatmap information 512 and a set of offset vectors 514.

Figure 6:
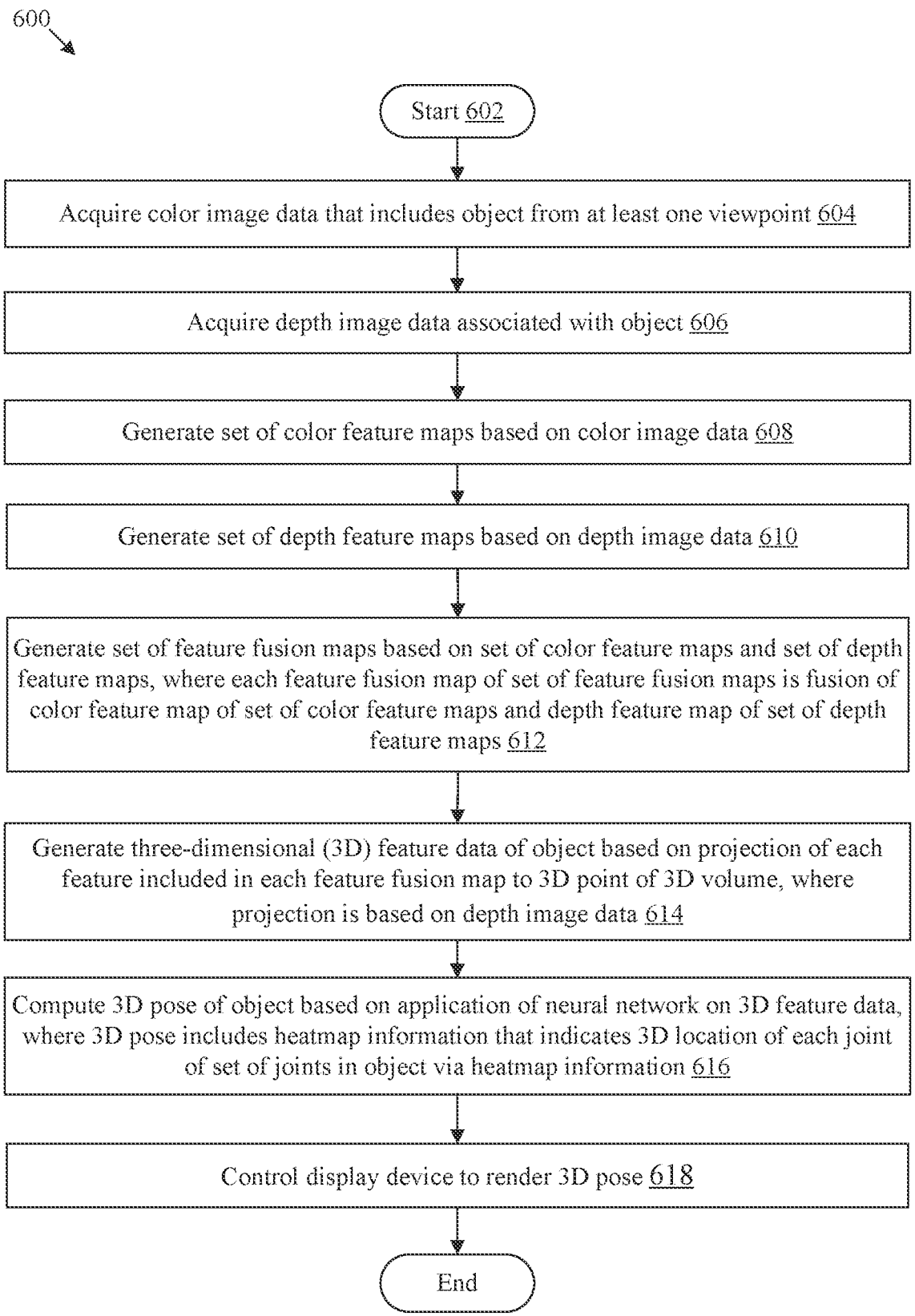
FIG. 6 is a flowchart that illustrates operations for an exemplary method for 3D pose estimation based on color and depth features, in accordance with an embodiment of the disclosure.

FIG. 6 is a flowchart that illustrates operations for an exemplary method for 3D pose estimation based on color and depth features, in accordance with an embodiment of the disclosure. FIG. 6 is explained in conjunction with elements from FIG. 1, FIG. 2, FIG. 3, FIG. 4, and FIG. 5. With reference to FIG. 6, there is shown a flowchart 600. The operations from 602 to 618 may be implemented by any computing system, such as, by the electronic device 102 of FIG. 1 or the circuitry of FIG. 2. The operations may start at 602 and may proceed to 604.

At 604, color image data 110, that may include the object 116 from at least one viewpoint may be acquired. In at least one embodiment, the circuitry 202 may be configured to acquire the color image data 110 that may include the object 116 from the at least one viewpoint. Details of acquisition of the color image data 110 are described, for example, in FIG. 1, FIG. 3, and FIG. 5.

At 606, depth image data 112 associated with the object 116 may be acquired. In at least one embodiment, the circuitry 202 may be configured to acquire the depth image data 112 associated with the object 116. Details of acquisition of the depth image data 112 are described, for example, in FIG. 1, FIG. 3, and FIG. 5.

At 608, a set of color feature maps may be generated based on the color image data 110. In at least one embodiment, the circuitry 202 may be configured to generate the set of color feature maps based on the color image data 110. Details of generation of color feature maps, are described, for example, in FIG. 1, FIG. 3, and FIG. 5.

At 610, a set of depth feature maps may be generated based on the depth image data 112. In at least one embodiment, the circuitry 202 may be configured to generate the set of depth feature maps based on the depth image data 112. Details of generation of depth feature maps, are described, for example, in FIG. 1, FIG. 3, and FIG. 5.

At 612, a set of feature fusion maps may be generated based on the set of color feature maps and the set of depth feature maps. In at least one embodiment, the circuitry 202 may be configured to generate the set of feature fusion maps based on the set of color feature maps and the set of depth feature maps. Each feature fusion map of the set of feature fusion maps may be a fusion of a color feature map of the set of color feature maps and a depth feature map of the set of depth feature maps. Details of generation of the set of feature fusion maps, are described, for example, in FIG. 1, FIG. 3, and FIG. 5.

At 614, a 3D feature data of the object 116 may be generated based on a projection of each feature, included in each feature fusion map of the set of feature fusion maps, to a 3D point of a 3D volume. In at least one embodiment, the circuitry 202 may be configured to generate the 3D feature data of the object 116 based on the projection of each feature, included in each feature fusion map of the set of feature fusion maps, to the 3D point of the 3D volume. The projection may be based on the depth image data 112. Details of generation of the 3D feature data of the object 116, are described, for example, in FIG. 1, FIG. 3, and FIG. 5.

At 616, the 3D pose 114 of the object 116 may be computed based on an application of the pose estimation neural network 102B on the 3D feature data. In at least one embodiment, the circuitry 202 may be configured to compute the 3D pose 114 of the object 116 based on the application of the pose-estimation neural network 102B on the 3D feature data. The 3D pose may include heatmap information that may indicate a 3D location of each joint of a set of joints in the object 116. Details of computation of the 3D pose 114 of the object 116, are described, for example, in FIG. 1, FIG. 3, and FIG. 5.

At 618, the display device 210 may be controlled to render the 3D pose 114. In at least one embodiment, the circuitry 202 may be configured to control the display device 210 to render the 3D pose 114. Details of controlling of the display device 210 for rendering of the 3D pose 114, are described, for example, in FIG. 1 and FIG. 3. Control may pass to end.

Although the flowchart 600 is illustrated as discrete operations, such as 604, 606, 608, 610, 612, 614, 616, and 618, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (such as the electronic device 102). The computer-executable instructions may cause the machine and/or computer to perform operations that include acquisition of color image data (such as the color image data 110) that may include an object (such as the object 116) from at least one viewpoint. The operations may further include acquisition of depth image data (such as the depth image data 112) associated with the object 116. The operations may further include generation of a set of color feature maps based on the color image data 110. The operations may further include generation of a set of depth feature maps based on the depth image data 112. The operations may further include generation of a set of feature fusion maps based on the set of color feature maps and the set of depth feature maps. Each feature fusion map of the set of feature fusion maps may be a fusion of a color feature map of the set of color feature maps and a depth feature map of the set of depth feature maps. The operations may further include generation of 3D feature data of the object 116 based on a projection of each feature included in each feature fusion map to a 3D point of a 3D volume. The projection may be based on the depth image data 112. The operations may further include computation of a 3D pose (such as the 3D pose 114) of the object 116 based on an application of a pose-estimation neural network (such as the pose estimation neural network 102B) on the 3D feature data. The 3D pose 114 may include heatmap information that may indicate a 3D location of each joint of a set of joints in the object 116. The operations may further include controlling of a display device (such as the display device 210) to render the 3D pose 114.

Exemplary aspects of the disclosure may include an electronic device (such as, the electronic device 102 of FIG. 1) that may include circuitry (such as the circuitry 202). In an embodiment, the circuitry 202 may be configured to acquire color image data (such as the color image data 110) that may include an object (such as the object 116) from at least one viewpoint. The circuitry 202 may be further configured to acquire depth image data (such as the depth image data 112) associated with the object 116. The circuitry 202 may be further configured to generate a set of color feature maps based on the color image data 110. The circuitry 202 may be further configured to generate a set of depth feature maps based on the depth image data 112. The circuitry 202 may be further configured to generate a set of feature fusion maps based on the set of color feature maps and the set of depth feature maps. Each feature fusion map of the set of feature fusion maps may be a fusion of a color feature map of the set of color feature maps and a depth feature map of the set of depth feature maps. The circuitry 202 may be further configured to generate 3D feature data of the object 116 based on a projection of each feature included in each feature fusion map to a 3D point of a 3D volume. The projection may be based on the depth image data 112. The circuitry 202 may be further configured to compute a 3D pose (such as the 3D pose 114) of the object 116 based on an application of a pose-estimation neural network (such as the pose estimation neural network 102B) on the 3D feature data. The 3D pose 114 may include heatmap information that may indicate a 3D location of each joint of a set of joints in the object 116. The heatmap information may further indicate a confidence in a localization of each joint of the set of joints in the 3D volume. The 3D pose 114 may further include a set of offset vectors, each of which may represent a relative offset between the 3D location of a joint of the set of joints from a reference location of the joint. The generation of the heatmap information and the set of offset vectors may be based on application of a set of sparse 3D convolution operations on the 3D feature data. The circuitry 202 may be further configured to control a display device (such as the display device 210) to render the 3D pose 114. The 3D pose 114 may be rendered on a volumetric model of the object 116 that may include a set of connectors, and each connector of the set of connectors may connect two joints of the set of joints.

In accordance with an embodiment, the circuitry 202 may be further configured to apply a feature-fusion neural network (such as the feature-fusion neural network 102A) on a color feature map of the set of color feature maps and a depth feature map of the set of depth maps to generate a feature fusion map of the set of feature fusion maps. The color feature map and the depth feature map may correspond to the at least one viewpoint.

In accordance with an embodiment, the circuitry 202 may be further configured to generate a first result based on a concatenation of the depth feature map with the color feature map. The circuitry 202 may be further configured to generate a second result based on a concatenation of the color feature map with the depth feature map. The circuitry 202 may be further configured to apply a first convolution operation on the first result to generate a third result. The circuitry 202 may be further configured to apply a second convolution operation on the second result to generate an intermediate result. The circuitry 202 may be further configured to apply a deconvolution operation on the intermediate result to generate a fourth result. The circuitry 202 may be further configured to generate a fifth result based on a concatenation of the third result and the fourth result. The circuitry 202 may be further configured to apply a set of convolution-deconvolution operations on the fifth result to generate the feature fusion map.

In accordance with an embodiment, the circuitry 202 may be further configured to determine a set of camera parameters associated with one or more image capture devices used in the acquisition of the color image data 110. The circuitry 202 may be further configured to determine, from the depth image data 112, depth information that may correspond to a feature of a feature fusion map of the set of feature fusion maps. The circuitry 202 may be further configured to project the feature to the 3D point based on the depth information and the set of camera parameters.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other device adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:
  circuitry configured to:
    acquire color image data that includes an object from at least one viewpoint;
    acquire depth image data associated with the object;
    generate a set of color feature maps based on the color image data;
    generate a set of depth feature maps based on the depth image data;
    generate a set of feature fusion maps based on the set of color feature maps and the set of depth feature maps,
      wherein each feature fusion map of the set of feature fusion maps is a fusion of a color feature map of the set of color feature maps and a depth feature map of the set of depth feature maps;
    generate three-dimensional (3D) feature data of the object based on a projection of each feature included in each feature fusion map to a 3D point of a 3D volume,
      wherein the projection is based on the depth image data;
    compute a 3D pose of the object based on an application of a pose-estimation neural network on the 3D feature data,
      wherein the 3D pose includes heatmap information that indicates a 3D location of each joint of a set of joints in the object; and
    control a display device to render the 3D pose.

2. The electronic device according to claim 1, wherein the circuitry is further configured to apply a feature-fusion neural network on a color feature map of the set of color feature maps and a depth feature map of the set of depth maps to generate a feature fusion map of the set of feature fusion maps, and
wherein the color feature map and the depth feature map correspond to the at least one viewpoint.

3. The electronic device according to claim 2, wherein the circuitry is further configured to:
generate a first result based on a concatenation of the depth feature map with the color feature map;
generate a second result based on a concatenation of the color feature map with the depth feature map;
apply a first convolution operation on the first result to generate a third result;
apply a second convolution operation on the second result to generate an intermediate result;
apply a deconvolution operation on the intermediate result to generate a fourth result;
generate a fifth result based on a concatenation of the third result and the fourth result; and
apply a set of convolution-deconvolution operations on the fifth result to generate the feature fusion map.

4. The electronic device according to claim 1, wherein the circuitry is further configured to:
determine a set of camera parameters associated with one or more image capture devices used in the acquisition of the color image data;
determine, from the depth image data, depth information that corresponds to a feature of a feature fusion map of the set of feature fusion maps; and
project the feature to the 3D point based on the depth information and the set of camera parameters.

5. The electronic device according to claim 1, wherein the heatmap information further indicates a confidence in a localization of each joint of the set of joints in the 3D volume.

6. The electronic device according to claim 1, wherein the 3D pose further includes a set of offset vectors, each of which represents a relative offset between the 3D location of a joint of the set of joints from a reference location of the joint.

7. The electronic device according to claim 6, wherein the generation of the heatmap information and the set of offset vectors is based on application of a set of sparse 3D convolution operations on the 3D feature data.

8. The electronic device according to claim 1, wherein the 3D pose is rendered on a volumetric model of the object that includes a set of connectors, and each connector of the set of connectors connects two joints of the set of joints.

9. A method, comprising:
in an electronic device:
acquiring color image data that includes an object from at least one viewpoint;
acquiring depth image data associated with the object;
generating a set of color feature maps based on the color image data;
generating a set of depth feature maps based on the depth image data;
generating a set of feature fusion maps based on the set of color feature maps and the set of depth feature maps,
wherein each feature fusion map of the set of feature fusion maps is a fusion of a color feature map of the set of color feature maps and a depth feature map of the set of depth feature maps;
generating three-dimensional (3D) feature data of the object based on a projection of each feature included in each feature fusion map to a 3D point of a 3D volume,
wherein the projection is based on the depth image data;
computing a 3D pose of the object based on an application of a pose-estimation neural network on the 3D feature data,
wherein the 3D pose includes heatmap information that indicates a 3D location of each joint of a set of joints in the object; and
controlling a display device to render the 3D pose.

10. The method according to claim 9, further comprising applying a feature-fusion neural network on a color feature map of the set of color feature maps and a depth feature map of the set of depth maps to generate a feature fusion map of the set of feature fusion maps, and
wherein the color feature map and the depth feature map correspond to the at least one viewpoint.

11. The method according to claim 10, further comprising:
generating a first result based on a concatenation of the depth feature map with the color feature map;
generating a second result based on a concatenation of the color feature map with the depth feature map;
applying a first convolution operation on the first result to generate a third result;
applying a second convolution operation on the second result to generate an intermediate result;
apply a deconvolution operation on the intermediate result to generate a fourth result;
generating a fifth result based on a concatenation of the third result and the fourth result; and
applying a set of convolution-deconvolution operations on the fifth result to generate the feature fusion map.

12. The method according to claim 9, further comprising:
determining a set of camera parameters associated with one or more image capture devices used in the acquisition of the color image data;
determining, from the depth image data, depth information that corresponds to a feature of a feature fusion map of the set of feature fusion maps; and
projecting the feature to the 3D point based on the depth information and the set of camera parameters.

13. The method according to claim 9, wherein the heatmap information further indicates a confidence in a localization of each joint of the set of joints in the 3D volume.

14. The method according to claim 9, wherein the 3D pose further includes a set of offset vectors, each of which represents a relative offset between the 3D location of a joint of the set of joints from a reference location of the joint.

15. The method according to claim 14, wherein the generation of the heatmap information and the set of offset vectors is based on application of a set of sparse 3D convolution operations on the 3D feature data.

16. The method according to claim 9, wherein the 3D pose is rendered on a volumetric model of the object that includes a set of connectors, and each connector of the set of connectors connect two joints of the set of joints.

17. A non-transitory computer-readable medium having stored thereon, computer-executable instructions which, when executed by an electronic device, cause the electronic device to execute operations, the operations comprising:
acquiring color image data that includes an object from at least one viewpoint;
acquiring depth image data associated with the object;

generating a set of color feature maps based on the color image data;

generating a set of depth feature maps based on the depth image data;

generating a set of feature fusion maps based on the set of color feature maps and the set of depth feature maps, wherein each feature fusion map of the set of feature fusion maps is a fusion of a color feature map of the set of color feature maps and a depth feature map of the set of depth feature maps;

generating three-dimensional (3D) feature data of the object based on a projection of each feature included in each feature fusion map to a 3D point of a 3D volume, wherein the projection is based on the depth image data;

computing a 3D pose of the object based on an application of a pose-estimation neural network on the 3D feature data, wherein the 3D pose includes heatmap information that indicates a 3D location of each joint of a set of joints in the object; and controlling a display device to render the 3D pose.

18. The non-transitory computer-readable medium according to claim 17, wherein the heatmap information further indicates a confidence in a localization of each joint of the set of joints in the 3D volume.

19. The non-transitory computer-readable medium according to claim 17, wherein the 3D pose further includes a set of offset vectors, each of which represents a relative offset between the 3D location of a joint of the set of joints from a reference location of the joint.

20. The non-transitory computer-readable medium according to claim 19, wherein the generation of the heatmap information and the set of offset vectors is based on application of a set of sparse 3D convolution operations on the 3D feature data.

\* \* \* \* \*